United States Patent

Gürgens et al.

[11] 4,031,993
[45] June 28, 1977

[54] ELECTRONIC EMBOSSING MACHINE

[75] Inventors: Rainer Eberhard Gürgens; Helmut August Michael Schottle, both of Berlin, Germany

[73] Assignee: Pitney-Bowes, Inc., Stamford, Conn.

[22] Filed: Sept. 25, 1975

[21] Appl. No.: 616,639

[30] Foreign Application Priority Data

Oct. 1, 1974 Germany .................. 2446890

[52] U.S. Cl. ............................... 197/6.6; 197/18
[51] Int. Cl.² ........................................ B41J 1/30
[58] Field of Search .................. 197/6.4–6.7, 197/18, 100, 53; 318/685

[56] References Cited

UNITED STATES PATENTS

| | | | |
|---|---|---|---|
| 2,040,248 | 5/1936 | Dvorak et al. | 197/100 |
| 2,927,676 | 3/1960 | Abbondanza | 197/6.6 |
| 3,227,258 | 1/1966 | Pannier et al. | 197/6.6 |
| 3,263,789 | 8/1966 | Schacht | 197/6.6 |
| 3,282,389 | 11/1966 | Rvdisch et al. | 197/6.6 |
| 3,306,416 | 2/1967 | Dahlin et al. | 197/6.6 |
| 3,586,953 | 6/1971 | Markkanen | 318/685 |
| 3,789,971 | 2/1974 | Deyesso et al. | 197/18 |

*Primary Examiner*—Ralph T. Rader
*Attorney, Agent, or Firm*—Peter Vrahotes; William D. Soltow, Jr.; Albert W. Scribner

[57] ABSTRACT

This invention relates to an electronic embossing machine of the type which has a keyboard controlled die head bearing embossing dies. The die head is rotatably displaceable for placement into the embossing position in accordance with which character is to be embossed. Control means is provided so that the rotational displacement represents the shortest distance between the die last actuated and the die selected to be actuated next. The die head is lockable at the selected die position by means of a brake device and a pawl. Detection means are associated with the die head to determine its angular position, under whose effect one of two circuits is closed depending upon the direction of rotation the die head is to take for the shortest distance, in the case where the die which is selected through the keyboard control does not correspond to the die to be located next in the embossing position.

3 Claims, 2 Drawing Figures

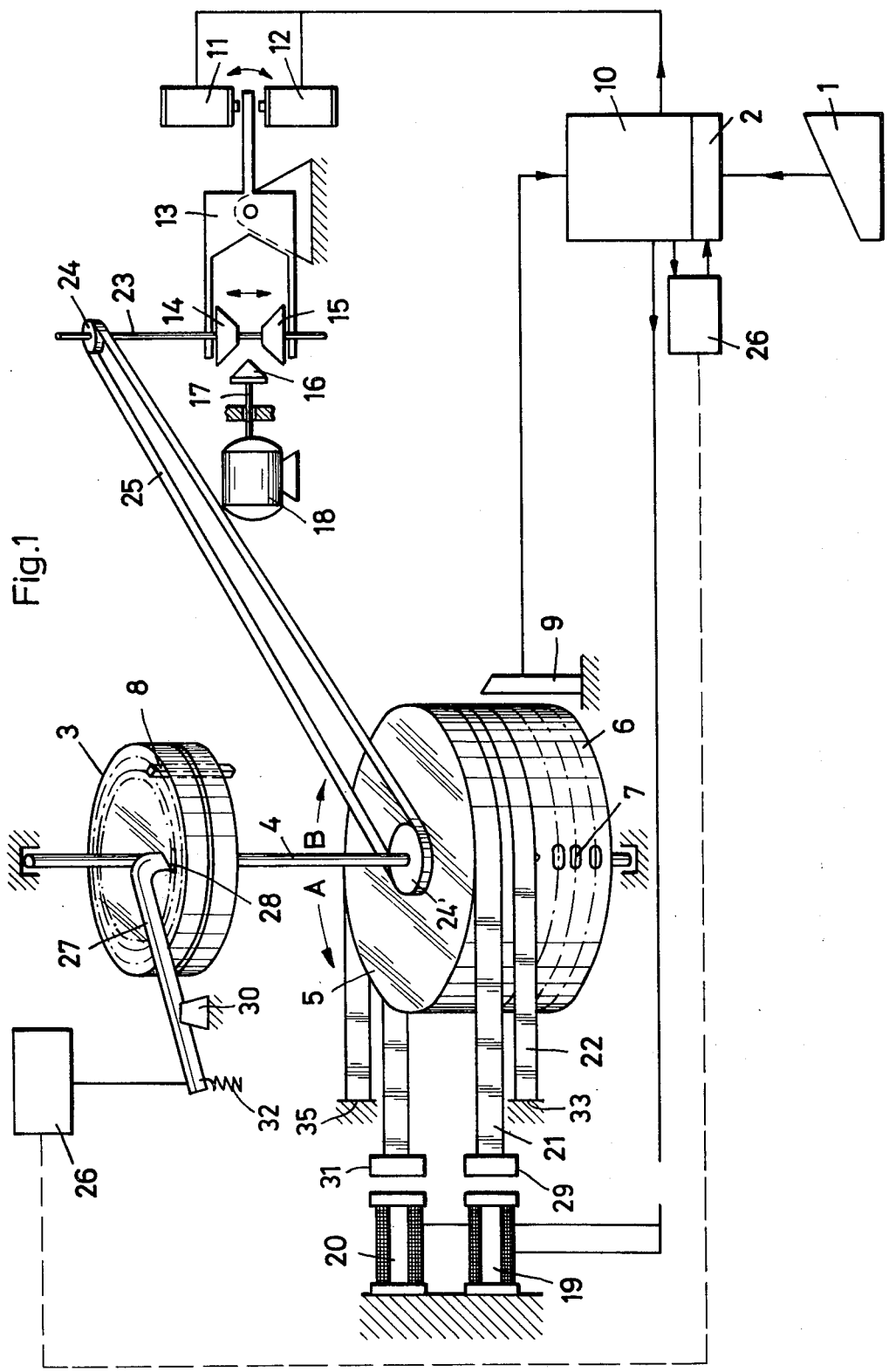

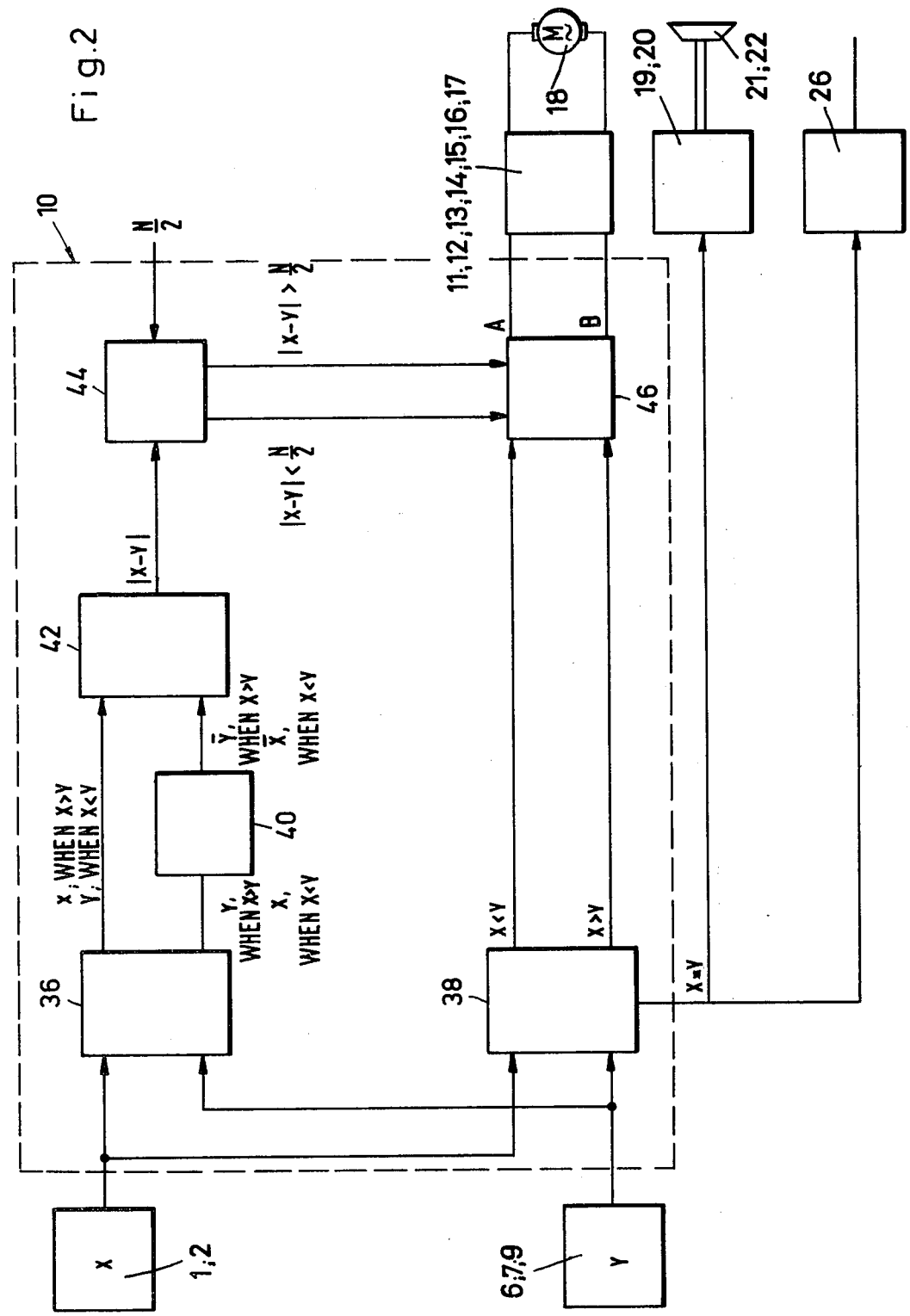

4,031,993

ELECTRONIC EMBOSSING MACHINE

BACKGROUND OF THE INVENTION

An embossing machine of the aforementioned type is exemplified in U.S. Pat. No. 2,927,676, wherein two sectors are provided and mounted to rotate with a die head having a rotational extent of less than 180°. Angularly fixed contact brushes are arranged for each die which are activated through associated keys of a keyboard and which cooperate with the sectors. In this way, one of two circuits is closed to determine the direction of rotation of the die head. The sectors are made out of conductive material and are mounted on a disk made out of dielectric material and arranged to rotate with the die head.

SUMMARY OF THE INVENTION

This invention is directed to an electronic embossing machine, having a rotating die head, and means for keeping the rotation of the die head as short as possible during placing of a selected die into the embossing position.

According to the invention, a code dial rotates together with the die head, and a scanning device is provided to ascertain from the code dial the die located in the embossing position. The output signal of the scanning device, which corresponds to a numerical code address assigned to the die located in the embossing position, and the output signal of a keyboard control means, which corresponds to the numerical code address of the die selected for embossing, are conveyed as input signals into a logic control means that includes a comparator which determines the difference between the two input signals. The logic control means supplies a first output signal to circuits for determination of the direction of rotation. The direction of rotation for the die head will be in the direction of descending numerical values of the coded addresses, in the case where the signal difference ascertained in the comparator proves positive and its absolute value is less than half the maximum numerical value of a code address, or proves negative and its absolute value is more than half the maximum numerical value of a code address. The direction of rotation for the die head will be in the direction of the ascending numerical values of the coded addresses corresponding to the respective dies, in the case where the signal difference determined in the comparator proves positive and its absolute value is more than half the maximum numerical value of a coded address, or proves negative and its absolute value is less than half the maximum numerical value of a code address.

The logic control means delivers a second output signal in lieu of the first output signal for ending the rotation of the die head, which was started in the predetermined direction of rotation, upon coincidence of both the input signals or ceasing of the signal difference, i.e. for stopping the die head when the die selected by the keyboard control means has arrived at its desired embossing position. Such a device is mechanically simple and, owing to its electronic performance, is very suitable for being adapted to electronic data processing equipment or peripheral equipment. Based on the shortest distance of displacement, high embossing speeds are obtainable, but in the case where a lower speed will suffice, a reduction of the drive power is possible.

A further reduction of the displacement with an accompanying increase of the embossing speed is attained by means of arranging the dies on the die head and the corresponding code addresses on the code dial in accordance with the statistical frequency of usage. In this way, 70% of all displacements of the die head fall within a range of only about 20 to 30% of the maximum necessary displacement. Such statistical frequency of usage information is readily available, as for example, from Rapid Fact Finder (1958) edited by H. Werdeman and published by T. Y. Crowell, N.Y., N.Y.

For operating with code addresses which are preferably digitally coded, it has been found useful to interpose between the keyboard control means and the logic control means an intermediate memory for the digitally coded addresses. The code address of the respective die, corresponding to the character is to be embossed, is delivered to the intermediate memory from the keyboard control means. After the embossing operation has been performed, the stored content in this intermediate memory is automatically cancelled so that the device is ready for the next operating cycle immediately.

BRIEF DESCRIPTION OF THE DRAWING

In the drawing, an embodiment of the present invention is illustrated, wherein;

FIG. 1 shows a partially perspective and partially schematic view of an electronic embossing machine which incorporates the invention and FIG. 2 shows a general diagram for the logic control means of the electronic embossing machine shown in FIG. 1.

DESCRIPTION OF THE PREFERRED EMBODIMENT

The character to be embossed, or the die to be actuated, is digitally determined through an electronic keyboard 1 and stored in an intermediate memory 2. A circular die head 3 of an embossing machine carries a plurality of dies 8 (only one being shown) and is mounted on a drive shaft 4 for rotation therewith. Additionally, a brake drum 5 and a code dial 6 are mounted on the drive shaft 4 for rotation therewith. Code addresses 7 are numerically arranged on the circumference of the code dial 6, which code addresses correspond to dies 8 on the die head 3 and are in the form of punched marks. These code addresses 7 are of the kind representing digits of a binary system, which are arranged in the order of their respective numerical position on the code dial 6.

Adjacent the periphery of the code dial 6 is a scanning device 9 which is arranged to read the code address 7 corresponding to the die 8 located at the embossing position. The scanning device 9 may be a conventional optical-electronic read head. The scanning device 9 produces an output signal that corresponds to the respective code address 7 which also may be a digital signal. This output signal from the scanning device 9 is processed by a logic controller 10 to which a further output signal is supplied from the intermediate memory 2. This latter output signal sent to the logic controller, which is obtained from the keyboard controller and delivered through the intermediated memory 2, corresponds to the die 8 whose character is desired to be embossed. The output signal which is processed and supplied to the logic controller through the scanning device 9, corresponds to the die 8 located in the embossing position. It may be pointed out again that the code addresses 7 are arranged on the code dial 6 in the order of their respective numerical values.

The logic controller 10 compares the two signals supplied to it and a differencial signal is generated having a plus or minus sign. Additionally, it is determined whether the output signal obtained from the scanning device 9 or the output signal obtained from the intermediate memory 2 is greater than that of the respective other signal. Subsequently, the code address numerical value of the character to be embossed, which is supplied as a signal from the keyboard controller 1, processed through the intermediate memory 2 and delivered to the logic controller 10, is indicated by "$x$". The code address numerical value of the character located at the embossing position, which is supplied as a signal from the scanning device 9 to the logic control means 10, is indicated by "$y$". Furthermore, the maximum numerical value of a code address is indicated by "$N$". The first direction of rotation, indicated by "A" in FIG. 1, is such that the rotation of the die head 3 together with its code dial 6 is in the direction of the ascending numerical values of the code addresses. The opposite direction of rotation, indicated by "B", is such that the direction of rotation of the die head 3 is in the direction of the descending numerical order of the code addresses. This can be further illustrated as follows:

The logic controller 10 will supply the drive means of the embossing machine with a signal which results in the die head 3 rotating in the direction of rotation "A", when:

1. $x > y$ and
2. $|x - y| < N/2$
1. $x < y$ and
2. $|x - y| > N/2$

On the other hand, the output signal will effect rotation in the "B'" direction when:

1. $x < y$ and
2. $|x - y| < N/2$
1. $x > y$ and
2. $|x - y| > N/2$

In the case that the difference of $|x - y|$ equals half the maximum numerical value N, the system is programmed to select one of the directions of rotation to assure immediate decision of the device. In the event that $x$ equals $y$, no rotational movement will result.

Controlling the drive of the embossing machine by the logic controller 10 is effected through two electromagnets 11 and 12 which serve for determining the direction of rotation and as shown FIG. 1. According to which of these electromagnets 11, 12 will be operated, a rocker 13 is moved so that either one of two opposed gears 14 or 15 will engage a rotating beveled gear 16 which is mounted on a continuously rotating shaft 17 of a drive motor 18. The gears 14, 15 are mounted on a shaft 23, which in turn supports a pulley 24. Another pulley 24' is secured to the shaft 4 and the two pulleys support a belt 25 to provide driving engagement between the shafts 4 and 23. It will be understood that various modifications may be made to obtain rotation of the die head 3 in one of two directions. For example, the die head 3 may be connected to a reversible motor.

According to the kind of drive control selected, rotation of the die head 3 is attained so that the die 8 which is selected at the keyboard 1 is moved over the shortest distance into the embossing position. During the rotational movement, the value of the code address of the die 8 selected at the keyboard 1, which value is stored in the intermediate memory 2, is continuously compared with the value of the code address of the die 8 located in the embossing position, which is determined by the scanning device 9 in cooperation with a comparator 38 which is part of the logic controller as shown in FIG. 2. As can be further noted from the above, the coincidence of $x$ and $y$ is examined in the logic controller 10. As soon as $x$ equals $y$, one of two electromagnets 19 or 20, respectively, is enabled by an output signal of the logic control means 10, thereby attracting a magnatizeable member 29, 31 secured to one end of a brake strap 21, 22, respectively, in accordance to one of the directions of rotation A or B, respectively. Each of the brake straps is fixedly secured at its opposite ends 33, 35, thereby providing a positive connection during the braking action.

Simultaneously with the braking action, one of the circuits 11, 12 becomes disabled, the rocker 13 returns into its neutral position, one of the gears 14, 15 becomes disengaged from the beveled gear 16, effecting the interruption of drive to the die head 3 and the code dial 6 through the shaft 23, the pulleys 24, 24' and the belt 25.

At the same time that the drive is being interrupted to the die head, a solenoid 26 controls the exact positioning of the die head 3. A pivotally mounted wedge-shaped pawl 27 locks into a suitable corresponding locking aperture 28 located in the die head 3 in order to set it into the exact embossing position. The pawl 27 is pivotably mounted upon a fulcrum 30 and its distal end is maintained in a lowered position by a spring 32. The solenoid 26 is also connected to the distal end of the pawl 27 and is operative to overcome the spring 32 in order to rotate the pawl about the fulcrum 30 so that the pawl is received with the appropriate locking aperture 28. The solenoid 26 also effects the embossing of the character which has been selected at the keyboard 1. Simultaneously, the stored content of the intermediate memory 2 is cancelled and the keyboard 1 is free to provide a new input to the logic control means 10. Thereupon, the brake strap 21, 22 is released i.e. the respective electromagnet 19 or 20 is de-energized through the logic controller 10. Finally, the locking of the die head 3 is terminated upon the pawl 27 being removed from the aperture 28 by the spring 32 upon disablement of the solenoid 26.

More specifically, referring now to FIG. 2, the character to be embosed is selected on the keyboard 1 and a signal is sent from the keyboard and memory 1, 2 to each of a pair of magnitude comparators 36, 38. This signal represents "$x$", the numerical value of the code address of the die selected for embossing. Another signal is sent from the scanning device 9 to each of the magnitude comparators 36, 38. This second signal represents "$y$", the numerical value of the code address of the die in the embossing position. The upper output from the magnitude comparator 36 will be $x$ when $x$ is greater than $y$ but will be $y$ when $x$ is less than $y$. The signal from the lower output of magnitude comparator 36 will be $y$ when $x$ is greater than $y$ and $x$ is less than $y$. The lower output from the magnitude comparator 36 is received in an inverter 40 and inverted $y'$ or $x'$ is then supplied to a magnitude determiner 42 as is the upper output. The magnitude determiner 42 receives the two signals and determines the absolute value of $|x - y|$, $|x - y|$, which becomes the output of magnitude determiner 42 and this output is then supplied to a comparator 44. A reference signal which is representative of N/2 is supplied to the comparator 44 which compares this reference signal against the signal $|x-y|$ received from magnitude determiner 42. A pair of outputs is provided which may be either negative or positive depending upon the results of the comparator 44, the two outputs being $|x-y| < N/2$ and $|x-y| > N/2$. The outputs from the comparator 44 are supplied to a unit 46 which comprises a plurality of gates, as are the outputs from the magnitude comparator 38. Those signals received from the comparator 44 indicate to the gate unit 46 the absolute distance between $x$ and $y$. Those signals received from the magnitude comparator 38 indicate the relative value between $x$ and $y$. The drive means of the embossing machine indicated by 11–18 in FIG. 2 will rotate the die head 3 in the rotation A when $x$ is greater than $y$ and $|x - y| < N/2$ or in the case where $X < y$ and $|x-y| > N/2$. The drive mechanism will rotate the die head 3 in the direction B when $x < y$ and $|x-y| < N/2$ or when $x > y$ and $|x-y| > N/2$. It will be appreciated that the outputs from the memory 1, 2 and the scanner 9 to the magnitude comparators 36, 38 are continuously being supplied and the values continuously changing in comparator 44 and magnitude comparator 38. When the point is reached that $x = y$ a signal is sent from the magnitude comparator 38 to one of the electromagnets 19, 20 to apply the appropriate brake strap 21, 22. At this point, also, a signal is sent to the solenoid 26 to lock the die head 3 with the pawl 27.

For further reduction of the necessary displacements of the die head 3, the dies 8 may be arranged on the die head according to the statistical frequency of usage. The dies 8 which are most frequently needed are proximately arranged on the peripheral sector of the die head 3. Obviously, the corresponding code addresses 7 are arranged on the periphery of the code dial 6 accordingly.

What is claimed is:

1. An electronic embossing machine comprising:
   a keyboard having a plurality of characters,
   a memory electronically associated with said keyboard to receive information therefrom and operative for storing such information,
   a logic controller associated with said memory for receiving information therefrom, said memory being operative to inform said logic controller as to the character selected by said keyboard,
   a drum supported upon a rotatable shaft for rotation therewith, said drum having a plurality of numerically arranged code addresses about the perimeter thereof,
   a scanner adjacent to said drum for reading said code addresses as they are conveyed thereacross, sid scanner being operatively connected with said logic controller for supplying information thereto and informing said logic controller as to the code address being read,
   a die head bearing a plurality of dies thereon and an opening intermediate adjacent dies, said die head being supported by said shaft for rotation therewith, said dies on said die head having characters thereon corresponding to the characters on said keyboard and to the code addresses on said drum, wherein the embossing position is defined as the posture of the die head when the code address corresponding to the die having the character selected by the keyboard is adjacent said scanner,
   brake means associated with said logic controller and operative to brake said shaft upon receipt of a brake signal from said logic controller, said brake means including a pair of brake straps disposed about said drum and a movable pawl disposed adjacent said die head,
   electromagnetic means connected to said one end of each brake strap and operative to extend its respective brake strap to engage said drum upon receipt of said brake signal and means for moving said pawl into an opening within said die head upon receipt of said brake signal,
   a pair of opposed electromagnets each operatively connected with said logic controller to be alternately energized thereby,
   drive means operatively connected to said shaft for rotation thereof in an "A" direction upon one of said electromagnets being energized and in a "B" direction upon the other of said electromagnets being energized, said logic controller upon receiving information from said memory indicating the selected character to be embossed and information from said scanner indicating which die is in the embossing position being operative to determine the required direction of rotation of said shaft for the shortest distance to place the die with the selected character into the embossing position and being operative to send a signal energizing the appropriate one of said electromagnets to drive said shaft until said selected character is placed in the embossing position, at which time said logic controller is operative to terminate the energizing of said electromagnets and actuate said brake means to hold said die head stationary with said selected die in the embossing position.

2. The electronic embossing machine of claim 1 wherein said logic controller includes:
   a pair of magnitude comparators each being electrically connected to said memory to receive a signal "X" indicating the die selected by said keyboard to be placed in the embossing position and to said scanner to receive a signal "Y" indicating the die located in the embossing position, each of said magnitude comparators having a pair of outputs;
   an inverter electrically connected to one of the outputs of the first of said magnitude comparators to invert the signal therefrom;
   a magnitude determiner in electrical connection with the output of said inverter and the other output of said first magnitude comparator to determine the absolute value of the difference in magnitude of the signals transmitted thereto;
   a third magnitude comparator electrically connected to said magnitude determiner to receive the output therefrom and having a pair of outputs;
   means for generating a reference signal, said generating means being in electrical connection with said third magnitude comparator; and
   a gate unit electrically connected to said third magnitude comparator through said two outputs of said third magnitude comparator to said two outputs of said second magnitude comparator and to said electromagnets;
   said second comparator having a third output which is in electrical connection with said electromagnetic means and to said pawl moving means.

3. The electronic embossing machine of claim 1 wherein the dies are arranged on the die head according to the statistical frequency of usage of the characters thereon.

* * * * *

UNITED STATES PATENT AND TRADEMARK OFFICE
CERTIFICATE OF CORRECTION

PATENT NO. : 4,031,993
DATED : June 28, 1977
INVENTOR(S) : Rainer Eberhard Gurgens and Helmut August Michael Schottle It is certified that error appears in the above-identified patent and that said Letters Patent are hereby corrected as shown below:

Title page, column 1:

line 3, change "[73] Assignee: Pitney-Bowes, Inc., Stamford, Conn." to --[73] Assignee: Adrema Pitney Bowes GmbH, Heppenheim, W. Germany--.

Signed and Sealed this

Twenty-second Day of November 1977

[SEAL]

Attest:

RUTH C. MASON
Attesting Officer

LUTRELLE F. PARKER
Acting Commissioner of Patents and Trademarks